United States Patent [19]

Sekiguchi et al.

[11] Patent Number: 5,390,962
[45] Date of Patent: Feb. 21, 1995

[54] FLEXIBLE JOINT FOR EXHAUST PIPE OF MOTOR VEHICLE

[75] Inventors: Yumi Sekiguchi; Masaaki Hamada, both of Komaki; Masahiko Fukui, Kagamihara, all of Japan

[73] Assignee: Tokai Rubber Industries, Ltd., Japan

[21] Appl. No.: 881,498

[22] Filed: May 11, 1992

[30] Foreign Application Priority Data

May 17, 1991 [JP] Japan ................. 3-142579

[51] Int. Cl.⁶ ............................................ F16L 11/12
[52] U.S. Cl. ............................. 285/53; 285/236; 285/423
[58] Field of Search ............... 285/53, 369, 417, 235, 285/236, 422, 423; 138/149, 124

[56] References Cited

U.S. PATENT DOCUMENTS

| | | |
|---|---|---|
| 3,460,856 | 8/1969 | Van Tine et al. .................. 285/53 |
| 3,550,899 | 12/1970 | Clarkson ........................ 285/236 X |
| 4,063,755 | 12/1977 | Merz ................................. 285/53 |
| 4,098,528 | 7/1978 | Stanley ......................... 285/369 X |
| 4,140,338 | 2/1979 | Kazmierski et al. ............. 285/53 X |
| 4,183,557 | 1/1980 | Hinden ............................ 285/53 |
| 4,229,028 | 10/1980 | Gray .............................. 285/369 X |

FOREIGN PATENT DOCUMENTS

0145020 6/1985 European Pat. Off. .

*Primary Examiner*—Dave W. Arola
*Attorney, Agent, or Firm*—Parkhurst, Wendel & Rossi

[57] ABSTRACT

A flexible joint for an exhaust pipe of a motor vehicle which includes: a cylindrical inner layer which consists of a cloth made of ceramic fibers, the inner layer being expansible in an axial direction thereof; an intermediate layer formed of a heat insulating material, for covering an outer circumferential surface of the inner layer; and a cylindrical outer layer disposed radially outwardly of the intermediate layer and formed of an elastic material.

8 Claims, 1 Drawing Sheet

FLEXIBLE JOINT FOR EXHAUST PIPE OF MOTOR VEHICLE

BACKGROUND OF THE INVENTION

1. Field of the Invention

The present invention relates to a flexible joint for an exhaust pipe of a motor vehicle, and more particularly to a flexible joint having a novel structure which assures improvements in the vibration damping or isolating effect and the mechanical strength (durability) of the exhaust pipe, for example.

2. Discussion of the Prior Art

An exhaust pipe of a motor vehicle is provided for guiding an exhaust gas emitted by an internal combustion engine of the vehicle, from an engine unit including the engine to the rear end of the vehicle. The exhaust pipe is connected at its front end portion to the engine, and is suspended and supported at its middle and rear portions by the vehicle body. If the exhaust pipe is formed as an integral rigid tube, the vibrational mass of the pipe tends to be large due to a great length thereof, causing increased transmission of vibrations from the pipe to the vehicle body, whereby the driving comfort of the vehicle is deteriorated. In this case, a relatively large stress is applied to the front end portion of the exhaust pipe, due to stress concentration caused by the vibrations or oscillations of the pipe, resulting in deterioration of the mechanical strength (durability) of the exhaust pipe.

In view of the above, the exhaust pipe is divided into a plurality of sections in the longitudinal direction thereof, such that the adjacent two sections are connected to each other by a flexible joint, so as to reduce the vibrational mass and stress concentration.

The vehicle exhaust pipe, whose temperature is elevated to 500° C. or higher even at its rear end portion, cannot employ ordinary flexible joints formed of an elastomeric material. Conventionally, the exhaust pipe is used with flexible joints such as a metallic bellows-like tube, or a so-called ball-joint type flexible joint which is formed by pressure-welding the corresponding end portions of the sections of the exhaust pipe, such that the pipe can be bent at these welded portions.

However, the conventional flexible joints as described above are unsatisfactory in flexibility, and are therefore incapable of providing required vibration isolating characteristics and sufficiently high durability of the exhaust pipe.

Additionally, there are recently some cases where the exhaust pipe is required to expand and contract at its joint portions in the longitudinal direction thereof, depending upon the form of installation of the engine, so as to reduce the vibrations of the pipe. However, this requirement has never been satisfied by the known flexible joints.

SUMMARY OF THE INVENTION

It is therefore an object of the present invention to provide a flexible joint for an exhaust pipe, which has a sufficiently high degree of heat resistance and which exhibits excellent flexibility and expansibility.

The above object may be attained according to the principle of the present invention, which provides a flexible joint for an exhaust pipe of a motor vehicle, comprising: (a) a cylindrical inner layer which consists of a cloth made of ceramic fibers, the inner layer being expansible in an axial direction thereof; (b) an intermediate layer formed of a heat insulating material, for covering an outer circumferential surface of the inner layer; and (c) a cylindrical outer layer disposed radially outwardly of the intermediate layer and formed of an elastic material.

In the flexible joint of the invention constructed as described above, the intermediate layer formed of the heat insulating material is provided on the outer surface of the inner layer in the form of a cloth made of ceramic fibers. Accordingly, the flexible joint may be provided with the outer layer formed of an elastic material such as rubber, the use of which was not practical in terms of poor heat resistance. Thus, the present flexible joint is given excellent flexibility and axial expansibility, which could not have been achieved by the known metallic joints.

The use of the thus constructed flexible joint for the exhaust pipe makes it possible to effectively reduce the vibrational mass of the exhaust pipe, and alleviate the stress concentration in the pipe, thereby assuring improved vibration isolating characteristics of the vehicle and improved durability of the exhaust pipe.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
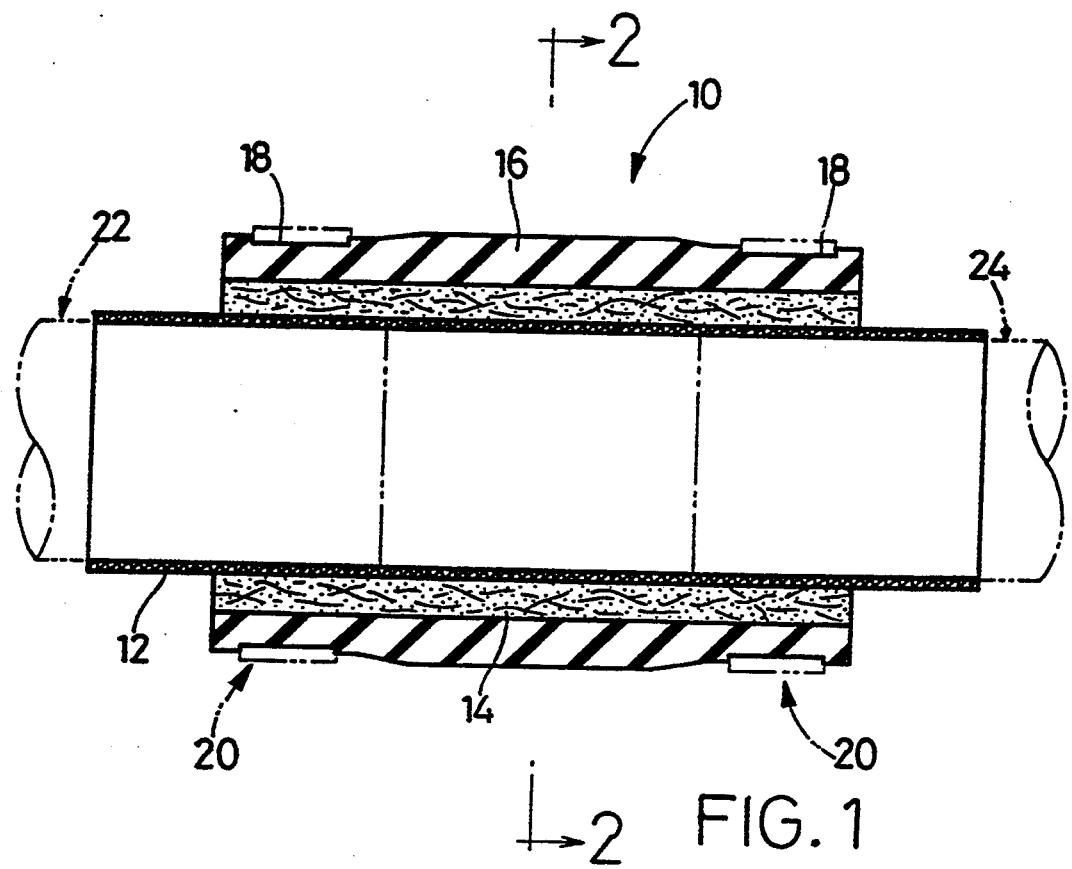
FIG. 1 is an elevational view in axial cross section of a flexible joint for an exhaust pipe as one embodiment of the present invention.
Figure 2:
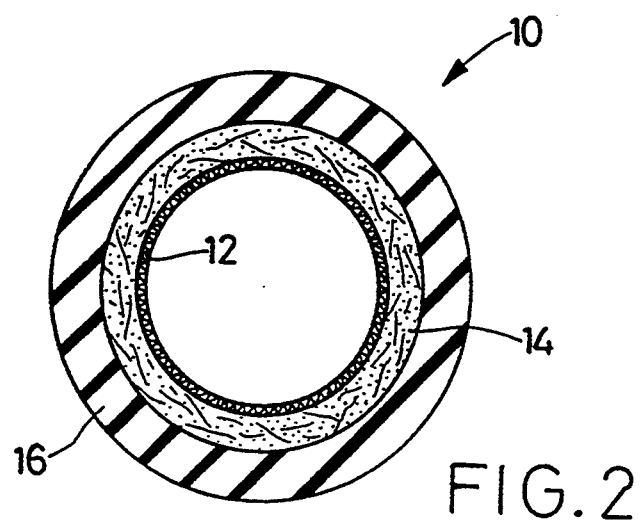
FIG. 2 is a cross sectional view taken along line 2—2 of FIG. 1.

Referring first to FIGS. 1 and 2, there is shown a flexible joint 10 for an exhaust pipe of a motor vehicle as one embodiment of the present invention. This flexible joint 10 as a whole assumes a generally thick-walled cylindrical shape, and its cylindrical wall portion consists of an inner layer 12, an intermediate layer 14 and an outer layer 16.

The inner layer 12 of the flexible joint 10 consists of a cloth formed of ceramic fibers. More specifically, the ceramic fibers used for the inner layer 12 may be selected from polycrystalline fibers, glass fibers, composite fibers, mono-crystalline fibers and various other fibers. Preferably, ceramic fibers of $Al_2O_3$—$SiO_2$—$B_2O_3$ or SiC are advantageously used in terms of heat resistance and handling ease, for example. Where the glass ceramic fibers are used for the inner layer 12, the glass materials of the fibers need to be selected in view of the temperature of the joint portions of the pipe, since some glass fibers have a relatively low softening point.

The inner layer 12 having a cylindrical shape is formed by weaving or knitting the ceramic fibers as indicated above, or compressing a mass of the fibers, to provide a cloth such as a woven fabric, a knitted fabric or a non-woven fabric. In forming the inner layer 12, the ceramic fibers may be formed directly into a cylindrical cloth. Alternatively, the ceramic fibers may be formed into a plane or flat cloth, which is then rolled and sewed up. The cloth which forms the inner layer 12 is adapted to support the intermediate layer 14 (which will be described), and is therefore desirable to have a high density of fibers.

The inner layer 12 is adapted to be expansible in the axial direction thereof. The axial expansibility of the inner layer 12 may be achieved by using a knitted or looped fabric made by knitting the ceramic fibers. Alternatively, a given width of woven fabric or non-woven fabric may be rolled around the pipe in a spiral form such that the inner layer 12 is axially expansible at its portions where two or more layers of the fabric are slidable relative to each other.

The intermediate layer 14 is disposed radially outwardly of the thus formed inner layer 12, such that the outer circumferential surface of the inner layer 12 is covered by the intermediate layer 14. The intermediate layer 14 is a heat insulating layer formed of a heat insulating material having high heat resistance. The axial length of the intermediate layer 14 is substantially the same as or smaller than that of the inner layer 12.

The intermediate layer 14 is generally required to be resistant to heat of at least 500° C., since the layer 14 is exposed to an exhaust gas having a considerably high temperature even if its inner circumferential surface is covered by the inner layer 12. The required heat resistance of the layer 14 varies depending upon the location of the flexible joint 10 with respect to the exhaust pipe. The heat insulating material of the intermediate layer 14 is favorably selected from various kinds of ceramic materials such as that of $Al_2O_3$—$SiO_2$. The intermediate layer 14 is supported at its inner surface by the inner layer 12, and may therefore take a granular form as well as the fibrous form.

The thickness of the intermediate layer 14 is determined in view of the thermal conductivity of the heat insulating material used, the location of the flexible joint 10 with respect to the exhaust pipe, namely, the temperature to which the layer 14 is exposed, and the material of the outer layer 16, for example. Thus, the intermediate layer 14 is designed to exhibit sufficiently high heat resistance so that the heat of the exhaust gas does not affect the outer layer 16.

The outer layer 16 is disposed radially outwardly of the intermediate layer 14. This outer layer 16 consists of a generally cylindrical rubber sleeve which has an axial length sufficient to cover the entire area of the outer surface of the intermediate layer 14.

While the rubber material of the outer layer 16 is not particularly limited, it is desirable to employ a rubber material which is sufficiently resistant to heat and exhaust gases, since the outer layer 16 might be exposed to a considerably high temperature due to heat transmission from the exhaust pipe, or to the exhaust gas transmitted through the intermediate layer 14. More specifically, a rubber material such as silicone rubber or fluoro rubber is preferably used for the outer layer 16. While the outer layer 16 consists of a rubber sleeve in the instant embodiment, the layer 16 may consist of a sleeve formed of other high polymers having suitable elasticity, for example.

The outer layer 16 is formed at its axially opposite end portions with a pair of circumferential grooves 18, 18. Each of the circumferential grooves 18 is adapted to receive a fastening ring 20 (which will be described).

The flexible joint 10 having the cylindrical wall portion which consists of the inner, intermediate and outer layers 12, 14, 16 may be manufactured by separately forming the rubber sleeve which gives the outer layer 16, the heat insulator which gives the intermediate layer 14, and the cloth which gives the inner layer 12, and then inserting the heat insulator and cloth into an inner bore of the sleeve. In an alternative manner, an unvulcanized rubber material for the outer layer 16 is first moulded into a sleeve, and the adiabator as the intermediate layer 14 and the cloth as the inner layer 12 are inserted into the inner bore of the rubber sleeve. Thereafter, the rubber material is vulcanized to thereby produce the flexible joint 10. In this case, the intermediate and outer layers 14, 16 can be bonded together, assuring improved handling ease of the joint 10.

For mounting the thus constructed flexible joint 10 on the exhaust pipe, the inner layer 12 is first fitted on the corresponding end portions of two sections 22, 24 of the exhaust pipe, and then fixedly fastened onto the outer surfaces of the sections 22, 24, by means of the fastening rings 20, 20 attached to the grooves 18, 18 of the outer layer 16, as shown in FIG. 1. In this manner, the two sections 22, 24 of the exhaust pipe are connected to each other by the flexible joint 10 while being held in fluid communication with each other.

Upon mounting of the flexible joint 10, the intermediate layer 14 is compressed radially inwards at its axially opposite portions corresponding to the two sections 22, 24 of the exhaust pipe, by means of the fastening rings 20 attached on the outer layer 16. In this arrangement, the exhaust gas is effectively prevented from leaking outside through the intermediate layer 14.

In the flexible joint 10 constructed as described above, the inner layer 12 consists of a cloth made of ceramic fibers, and cooperates with the rubber sleeve as the outer layer 16 to sandwich the heat insulator therebetween, to provide the intermediate layer 14 as a heat insulating layer. Thus, the present flexible joint 10 permits the use of rubber materials, which was not practical due to poor heat resistance in the known flexible joints.

Accordingly, the flexible joint 10 is able to readily exhibit a considerably high degree of flexibility which could not have been achieved by the known metallic joint. Consequently, the exhaust pipe with the present flexible joints has reduced vibrational mass, and is free from stress concentrations, assuring improvements in the vibration isolating characteristics of the vehicle and the mechanical strength (durability) of the exhaust pipe.

In the flexible joint 10 as described above, the inner layer 12 in the form of a cloth made of ceramic fibers is axially expansible. Therefore, the flexible joint 10 exhibits a sufficiently high degree of flexibility in the axial direction thereof, based on elastic deformation of the rubber sleeve as the outer layer 16, assuring further improved vibration isolating characteristics.

The flexible joint 10, which is formed by using the ceramic fibers, heat insulator and elastic rubber member, exhibits a considerably high degree of fatigue strength (durability) against its repetitive deformation caused by input vibrations, for example. Thus, the present flexible joint 10 exhibits significantly improved durability, as compared with conventional metallic joints.

Further, the thickness of the heat insulator (the intermediate layer 14) can be changed or adjusted depending upon the location of the flexible joint 10 with respect to the exhaust pipe, or the temperature of the heat transmitted from the exhaust pipe to the joint 10. Thus, the present flexible joint 10 can be suitably designed according to the location thereof with respect to the exhaust pipe.

While the present invention has been described in its preferred embodiment, for illustrative purpose only, it is to be understood that the invention is not limited to the details of the illustrated embodiment, but may be otherwise embodied.

For example, the thickness of each layer 12, 14, 16 of the flexible joint 10 is never limited, but may be suitably determined depending upon the material of the layer, and the location of the joint 10 with respect to the exhaust pipe. When the flexible joint 10 is mounted on a portion of the exhaust pipe just before a main muffler, for example, the inner layer 12 may be formed by knitting $Al_2O_3$—$SiO_2$—$B_2O_3$ fibers into a cylindrical cloth having a thickness of 1 mm, while the outer layer 16 may consist of a rubber sleeve formed of silicone rubber and having a wall thickness of 7 mm. In this case, the intermediate layer 14 may consist of a heat insulator formed of $Al_2O_3$—$SiO_2$ short fibers and having a thickness of 12.5 mm, to provide a sufficiently high degree of heat insulating property.

In the illustrated embodiment, the intermediate layer 14 is exposed to the outside at axially opposite end faces of the flexible joint 10. However, the axial end faces of the joint 10 may be covered by ceramic fibers, for example, so as to prevent the heat-insulating intermediate layer 14 from slipping out of the joint 10.

It is also to be understood that the present invention may be embodied with various other changes, modifications and improvements, which may occur to those skilled in the art, without departing from the spirit and scope of the invention defined in the following claims.

What is claimed is:

1. A flexible joint for an exhaust pipe of a motor vehicle, comprising:
   a cylindrical inner layer which consists of a cloth made of ceramic fibers, said inner layer being expansible in an axial direction thereof;
   an intermediate layer formed of a heat insulating material, for covering an outer circumferential surface of said inner layer; and
   a cylindrical outer layer disposed radially outwardly of said intermediate layer and formed of an elastic material.

2. A flexible joint according to claim 1, wherein said ceramic fibers of said inner layer are selected from the group consisting of polycrystalline fibers, glass fibers, composite fibers and mono-crystalline fibers.

3. A flexible joint according to claim 2, wherein said ceramic fibers are $Al_2O_3$—$SiO_2$—$B_2O_3$ fibers.

4. A flexible joint according to claim 2, wherein said ceramic fibers are SiC fibers.

5. A flexible joint according to claim 1, wherein said intermediate layer is resistant to heat of at least 500° C.

6. A flexible joint according to claim 1, wherein said intermediate layer is formed of a ceramic material of $Al_2O_3$—$SiO_2$ as said heat insulating material.

7. A flexible joint according to claim 1, wherein said outer sleeve is formed of one of silicone rubber and fluoro rubber as said elastic material.

8. A flexible joint according to claim 1, further comprising a pair of rings attached to axially opposite end portions of said outer layer, for fastening said inner layer, along with said intermediate layer interposed between said inner and outer layers, onto the exhaust pipe.

* * * * *